US008409357B2

(12) United States Patent
Simard et al.

(10) Patent No.: US 8,409,357 B2
(45) Date of Patent: Apr. 2, 2013

(54) SELF-CLEANING APPARATUS AND METHOD FOR THICK SLURRY PRESSURE CONTROL

(75) Inventors: Michel Adam Simard, Berwyn, PA (US); Scott William Sommer, Phoenixville, PA (US)

(73) Assignee: Renmatix, Inc., King of Prussia, PA (US)

( * ) Notice: Subject to any disclaimer, the term of this patent is extended or adjusted under 35 U.S.C. 154(b) by 0 days.

(21) Appl. No.: 13/437,264

(22) Filed: Apr. 2, 2012

(65) Prior Publication Data

US 2012/0279579 A1 Nov. 8, 2012

Related U.S. Application Data

(62) Division of application No. 13/366,651, filed on Feb. 6, 2012.

(60) Provisional application No. 61/482,449, filed on May 4, 2011.

(51) Int. Cl.
*C08B 37/00* (2006.01)
*B01D 17/00* (2006.01)

(52) U.S. Cl. ............... 127/46.1; 127/2; 162/1; 162/100; 137/1; 137/613; 137/614; 137/628; 210/696

(58) Field of Classification Search .............. 137/1, 613, 137/614, 628, 637, 637.1; 127/1, 2, 46, 46.1, 127/47, 48, 53, 55; 162/1, 2, 14, 17, 18, 162/19, 100, 201, 233; 210/634, 696, 767
See application file for complete search history.

(56) References Cited

U.S. PATENT DOCUMENTS

| | | | | |
|---|---|---|---|---|
| 1,783,163 | A * | 11/1930 | Griswold, Jr. | 137/14 |
| 1,938,802 | A * | 12/1933 | Braun et al. | 162/19 |
| 2,156,159 | A | 4/1939 | Olson et al. | |
| 2,198,785 | A | 4/1940 | Mohr et al. | |
| 2,356,500 | A | 8/1944 | Boinot | |
| 2,516,833 | A | 8/1950 | Ant-Wuorinen | |
| 2,681,871 | A | 6/1954 | Wallace | |
| 2,759,856 | A | 8/1956 | Saums et al. | |
| 2,801,939 | A | 8/1957 | Hignett et al. | |
| 2,810,394 | A | 10/1957 | Ferguson | |
| 2,822,784 | A | 2/1958 | Heller et al. | |
| 2,851,382 | A | 9/1958 | Schmidt | |
| 2,881,783 | A | 4/1959 | Andrews | |
| 2,994,633 | A | 8/1961 | Clark | |
| 2,997,466 | A | 8/1961 | Ball et al. | |
| 3,212,932 | A | 10/1965 | Hess et al. | |

(Continued)

FOREIGN PATENT DOCUMENTS

| | | |
|---|---|---|
| AU | 2002234469 | 7/2007 |
| CA | 1010859 | 5/1977 |

(Continued)

OTHER PUBLICATIONS (Abstract) "Evaluation of materials for use in letdown valves and coal feed pumps for coal liquefaction service", Electr Power Res Inst Rep EPRIAF, No. 579, 1978, 94.

(Continued)

*Primary Examiner* — Joseph Drodge
(74) *Attorney, Agent, or Firm* — Kilpatrick Townsend & Stockton LLP

(57) ABSTRACT

Self-cleaning apparatus and methods are disclosed for handling viscous fluids, such as thick solid-liquid slurries of lignocellulosic biomass and its components, under high pressure, using an array of retractable valves.

27 Claims, 3 Drawing Sheets

U.S. PATENT DOCUMENTS

| | | | | |
|---|---|---|---|---|
| 3,314,797 | A | 4/1967 | Hess et al. | |
| 3,792,719 | A | 2/1974 | Dickinson | |
| 3,896,005 | A | 7/1975 | Zuccolotto | |
| 3,918,471 | A | 11/1975 | Bedner | |
| 3,990,904 | A | 11/1976 | Friese et al. | |
| 4,100,016 | A | 7/1978 | Diebold et al. | |
| 4,105,467 | A | 8/1978 | Buckl et al. | |
| 4,201,596 | A | 5/1980 | Church et al. | |
| 4,308,200 | A | 12/1981 | Fremont | |
| 4,316,747 | A | 2/1982 | Rugg et al. | |
| 4,316,748 | A | 2/1982 | Rugg et al. | |
| 4,318,748 | A | 3/1982 | Church | |
| 4,338,199 | A | 7/1982 | Modell | |
| 4,363,671 | A | 12/1982 | Rugg et al. | |
| 4,366,322 | A | 12/1982 | Raymond | |
| 4,368,079 | A | 1/1983 | Rugg et al. | |
| 4,405,377 | A * | 9/1983 | Neuzil | 127/46.2 |
| 4,409,032 | A | 10/1983 | Paszner et al. | |
| 4,427,453 | A | 1/1984 | Reitter | |
| 4,468,256 | A | 8/1984 | Hinger | |
| 4,470,851 | A | 9/1984 | Paszner et al. | |
| 4,493,797 | A | 1/1985 | Avedesian | |
| 4,520,105 | A | 5/1985 | Sinner et al. | |
| 4,535,593 | A | 8/1985 | Sakka | |
| 4,543,190 | A | 9/1985 | Modell | |
| 4,556,430 | A | 12/1985 | Converse et al. | |
| 4,607,819 | A | 8/1986 | Spils | |
| 4,612,286 | A | 9/1986 | Sherman et al. | |
| 4,637,835 | A | 1/1987 | Nagle | |
| 4,644,060 | A | 2/1987 | Chou | |
| 4,645,541 | A | 2/1987 | DeLong | |
| 4,674,285 | A | 6/1987 | Durrant et al. | |
| 4,675,198 | A | 6/1987 | Sevenants | |
| 4,699,124 | A | 10/1987 | Nagle | |
| 4,742,814 | A | 5/1988 | Sinner et al. | |
| 4,764,596 | A | 8/1988 | Lora et al. | |
| 4,857,638 | A | 8/1989 | Yalpani et al. | |
| 4,946,946 | A | 8/1990 | Fields et al. | |
| 4,964,995 | A | 10/1990 | Chum et al. | |
| 5,009,746 | A | 4/1991 | Hossain et al. | |
| 5,041,192 | A | 8/1991 | Sunol et al. | |
| 5,125,977 | A | 6/1992 | Grohmann et al. | |
| 5,169,687 | A | 12/1992 | Sunol | |
| 5,196,460 | A | 3/1993 | Lora et al. | |
| 5,213,660 | A | 5/1993 | Hossain et al. | |
| 5,328,934 | A | 7/1994 | Schiraldi | |
| 5,338,366 | A | 8/1994 | Grace et al. | |
| 5,411,594 | A | 5/1995 | Brelsford | |
| 5,424,417 | A | 6/1995 | Torget et al. | |
| 5,503,996 | A | 4/1996 | Torget et al. | |
| 5,512,231 | A | 4/1996 | Thies et al. | |
| 5,516,952 | A | 5/1996 | Lee et al. | |
| 5,536,325 | A | 7/1996 | Brink | |
| 5,558,783 | A | 9/1996 | McGuinness | |
| 5,615,708 | A * | 4/1997 | Barron | 137/625.3 |
| 5,628,830 | A | 5/1997 | Brink | |
| 5,705,369 | A | 1/1998 | Torget et al. | |
| 5,788,812 | A | 8/1998 | Agar et al. | |
| 5,811,527 | A | 9/1998 | Ishitoku et al. | |
| 5,824,187 | A | 10/1998 | Richter et al. | |
| 5,830,763 | A | 11/1998 | Junk et al. | |
| 5,980,640 | A | 11/1999 | Nurmi et al. | |
| 6,022,419 | A | 2/2000 | Torget et al. | |
| 6,025,452 | A | 2/2000 | Kurple | |
| 6,090,291 | A | 7/2000 | Akai et al. | |
| 6,180,845 | B1 | 1/2001 | Catallo et al. | |
| 6,228,177 | B1 | 5/2001 | Torget | |
| 6,419,788 | B1 | 7/2002 | Wingerson | |
| 6,555,350 | B2 | 4/2003 | Ahring et al. | |
| 6,569,640 | B1 | 5/2003 | Castor et al. | |
| 6,642,396 | B1 | 11/2003 | Zeitsch et al. | |
| 6,743,928 | B1 | 6/2004 | Zeitsch | |
| 6,872,316 | B2 | 3/2005 | Heikkilä et al. | |
| 6,878,212 | B1 | 4/2005 | Pinatti et al. | |
| 6,921,820 | B2 | 7/2005 | Arai et al. | |
| 6,929,752 | B2 | 8/2005 | Cansell | |
| 7,189,306 | B2 | 3/2007 | Gervais | |
| 7,238,242 | B2 | 7/2007 | Pinatti et al. | |
| 7,259,231 | B2 | 8/2007 | Cornish et al. | |
| 7,262,331 | B2 | 8/2007 | van de Beld et al. | |
| 7,476,296 | B2 | 1/2009 | Appel et al. | |
| 7,547,539 | B2 | 6/2009 | Ikegami et al. | |
| 7,566,383 | B2 | 7/2009 | Everett et al. | |
| 7,585,652 | B2 | 9/2009 | Foody et al. | |
| 7,649,086 | B2 | 1/2010 | Belanger et al. | |
| 7,666,637 | B2 | 2/2010 | Nguyen | |
| 7,670,813 | B2 | 3/2010 | Foody et al. | |
| 7,754,457 | B2 | 7/2010 | Foody et al. | |
| 7,771,699 | B2 | 8/2010 | Adams et al. | |
| 7,955,508 | B2 | 6/2011 | Allan et al. | |
| 7,960,325 | B2 | 6/2011 | Kluko | |
| 8,030,039 | B1 | 10/2011 | Retsina et al. | |
| 8,057,639 | B2 | 11/2011 | Pschorn et al. | |
| 8,119,823 | B2 | 2/2012 | Kilambi | |
| 8,282,738 | B2 | 10/2012 | Kilambi et al. | |
| 2001/0050096 | A1 | 12/2001 | Costantini et al. | |
| 2002/0061583 | A1 | 5/2002 | Kawamura et al. | |
| 2002/0069987 | A1 | 6/2002 | Pye | |
| 2003/0156970 | A1 | 8/2003 | Oberkofler et al. | |
| 2003/0221361 | A1 | 12/2003 | Russell et al. | |
| 2004/0020854 | A1 * | 2/2004 | Ali et al. | 210/652 |
| 2004/0231661 | A1 | 11/2004 | Griffin et al. | |
| 2005/0065336 | A1 | 3/2005 | Karstens | |
| 2006/0281913 | A1 | 12/2006 | Ferreira et al. | |
| 2007/0108036 | A1 * | 5/2007 | Siskin et al. | 201/21 |
| 2007/0148751 | A1 | 6/2007 | Griffin et al. | |
| 2007/0161095 | A1 | 7/2007 | Gurin | |
| 2007/0217980 | A1 | 9/2007 | Garcia-Ortiz et al. | |
| 2007/0254348 | A1 | 11/2007 | Retsina et al. | |
| 2007/0259412 | A1 | 11/2007 | Belanger et al. | |
| 2007/0267008 | A1 | 11/2007 | Funazukuri et al. | |
| 2008/0015336 | A1 | 1/2008 | Cornish et al. | |
| 2008/0029233 | A1 * | 2/2008 | Wingerson et al. | 162/60 |
| 2008/0032344 | A1 | 2/2008 | Fallavollita | |
| 2008/0051566 | A1 | 2/2008 | Ohman et al. | |
| 2008/0292766 | A1 | 11/2008 | Hoffman et al. | |
| 2008/0295981 | A1 | 12/2008 | Shin et al. | |
| 2008/0302492 | A1 | 12/2008 | Shin et al. | |
| 2009/0023187 | A1 | 1/2009 | Foody et al. | |
| 2009/0038212 | A1 | 2/2009 | Cooper | |
| 2009/0056201 | A1 | 3/2009 | Morgan | |
| 2009/0118477 | A1 * | 5/2009 | Hallberg et al. | 530/500 |
| 2009/0121166 | A1 | 5/2009 | Gabelgaard | |
| 2009/0176286 | A1 | 7/2009 | O'Connor et al. | |
| 2009/0176979 | A1 | 7/2009 | Hara et al. | |
| 2009/0205546 | A1 | 8/2009 | Kluko | |
| 2009/0221814 | A1 | 9/2009 | Pschorn et al. | |
| 2009/0223612 | A1 | 9/2009 | McKnight et al. | |
| 2009/0229599 | A1 | 9/2009 | Zhang | |
| 2009/0232892 | A1 | 9/2009 | Yamasaki et al. | |
| 2009/0288788 | A1 | 11/2009 | Castor | |
| 2010/0004119 | A1 | 1/2010 | Gadkaree | |
| 2010/0012583 | A1 | 1/2010 | Stuart | |
| 2010/0043782 | A1 * | 2/2010 | Kilambi et al. | 127/1 |
| 2010/0048884 | A1 | 2/2010 | Kilambi | |
| 2010/0048924 | A1 | 2/2010 | Kilambi | |
| 2010/0055629 | A1 | 3/2010 | McKnight et al. | |
| 2010/0063271 | A1 | 3/2010 | Allan et al. | |
| 2010/0069626 | A1 | 3/2010 | Kilambi | |
| 2010/0077752 | A1 | 4/2010 | Papile | |
| 2010/0081798 | A1 | 4/2010 | Balensiefer et al. | |
| 2010/0136634 | A1 | 6/2010 | Kratochvil et al. | |
| 2010/0136642 | A1 | 6/2010 | Belanger et al. | |
| 2010/0146842 | A1 | 6/2010 | Dumenil | |
| 2010/0146843 | A1 | 6/2010 | Dumenil | |
| 2010/0152509 | A1 | 6/2010 | Ekman | |
| 2010/0159569 | A1 | 6/2010 | Medoff et al. | |
| 2010/0175690 | A1 | 7/2010 | Nagahama et al. | |
| 2010/0184151 | A1 | 7/2010 | Tolan et al. | |
| 2010/0233771 | A1 | 9/2010 | McDonald et al. | |
| 2010/0269990 | A1 | 10/2010 | Dottori et al. | |
| 2010/0279361 | A1 | 11/2010 | South et al. | |
| 2010/0326610 | A1 * | 12/2010 | Harvey et al. | 162/17 |
| 2010/0329938 | A1 | 12/2010 | Allan et al. | |
| 2010/0330638 | A1 | 12/2010 | Aita et al. | |
| 2011/0021743 | A1 | 1/2011 | Cornish et al. | |
| 2011/0076724 | A1 | 3/2011 | Dumenil | |

| | | | |
|---|---|---|---|
| 2011/0079219 A1 | 4/2011 | McDonald et al. | |
| 2011/0100359 A1 | 5/2011 | North | |
| 2011/0126448 A1 | 6/2011 | Dumenil | |
| 2011/0137085 A1 | 6/2011 | Trahanovsky et al. | |
| 2011/0151516 A1 | 6/2011 | Van Der Heide et al. | |
| 2011/0165643 A1 | 7/2011 | Retsina et al. | |
| 2011/0171709 A1 | 7/2011 | Bardsley | |
| 2011/0192560 A1 | 8/2011 | Heikkila et al. | |
| 2011/0232160 A1 | 9/2011 | Siskin et al. | |
| 2011/0237838 A1 | 9/2011 | Zmierczak et al. | |
| 2011/0239973 A1 | 10/2011 | Qin | |
| 2011/0253326 A1 | 10/2011 | Sherman et al. | |
| 2011/0287502 A1 | 11/2011 | Castor | |
| 2011/0294991 A1 | 12/2011 | Lake et al. | |
| 2012/0103325 A1* | 5/2012 | Koenig et al. | 127/67 |
| 2012/0108798 A1 | 5/2012 | Wenger et al. | |
| 2012/0116063 A1 | 5/2012 | Jansen et al. | |
| 2012/0145094 A1 | 6/2012 | Simard | |
| 2012/0146784 A1 | 6/2012 | Hines et al. | |
| 2012/0184788 A1 | 7/2012 | Loop et al. | |
| 2012/0279496 A1 | 11/2012 | Tao | |
| 2012/0279573 A1 | 11/2012 | Simard et al. | |
| 2012/0282465 A1 | 11/2012 | Kadam et al. | |
| 2012/0282466 A1 | 11/2012 | Iyer et al. | |
| 2012/0282467 A1 | 11/2012 | Iyer et al. | |
| 2012/0282655 A1 | 11/2012 | Gibbs | |
| 2012/0282656 A1 | 11/2012 | Gibbs | |
| 2012/0285445 A1 | 11/2012 | Kilambi et al. | |
| 2012/0291774 A1 | 11/2012 | Kilambi et al. | |

FOREIGN PATENT DOCUMENTS

| | | |
|---|---|---|
| CA | 1284637 | 6/1991 |
| CN | 1680415 | 10/2005 |
| CN | 1931866 | 3/2007 |
| CN | 101200479 | 6/2008 |
| CN | 101613970 | 12/2009 |
| CN | 101736631 | 6/2010 |
| CN | 101787398 | 7/2010 |
| CN | 101886143 | 11/2010 |
| CN | 102239184 | 11/2011 |
| CZ | 225851 | 3/1984 |
| CZ | 248106 | 1/1987 |
| DE | 3225074 | 1/1984 |
| DE | 10259928 A1 | 7/2004 |
| EP | 0037912 | 10/1981 |
| EP | 1194226 | 9/2004 |
| EP | 1364072 | 1/2007 |
| EP | 1527204 | 4/2008 |
| EP | 1836181 | 3/2009 |
| FR | 2580669 | 10/1986 |
| GB | 291991 | 6/1928 |
| GB | 692284 | 6/1953 |
| GB | 1245486 | 9/1971 |
| GB | 1569138 | 6/1980 |
| GB | 2145090 | 3/1985 |
| JP | 50145537 | 11/1975 |
| JP | 56045754 | 4/1981 |
| JP | 57061083 | 4/1982 |
| JP | 62283988 | 12/1987 |
| JP | 04197192 | 7/1992 |
| JP | 11226385 | 8/1999 |
| JP | 2001095594 | 4/2001 |
| JP | 2001262162 | 9/2001 |
| JP | 2001347298 | 12/2001 |
| JP | 2003212888 | 7/2003 |
| JP | 2005040025 | 2/2005 |
| JP | 2005296906 | 10/2005 |
| JP | 2006223152 | 8/2006 |
| JP | 2006263527 | 10/2006 |
| JP | 2007313476 | 12/2007 |
| JP | 2008011753 | 1/2008 |
| JP | 2008035853 | 2/2008 |
| JP | 2008292018 | 12/2008 |
| JP | 2009189291 | 8/2009 |
| JP | 201132388 | 2/2011 |
| KR | 2009030967 | 3/2009 |
| KR | 20090039470 | 4/2009 |
| KR | 20100032242 | 3/2010 |
| RU | 2371002 | 10/2009 |
| WO | 8300370 | 2/1983 |
| WO | 8301958 | 6/1983 |
| WO | 9423226 | 10/1994 |
| WO | 9817727 | 4/1998 |
| WO | 9923260 | 5/1999 |
| WO | 9967409 | 12/1999 |
| WO | 0160752 | 8/2001 |
| WO | 0204524 | 1/2002 |
| WO | 02070753 | 9/2002 |
| WO | 2007056701 | 5/2007 |
| WO | 2008026932 | 3/2008 |
| WO | 2008036500 | 3/2008 |
| WO | 2008050740 | 5/2008 |
| WO | 2008121043 | 10/2008 |
| WO | 2008143078 | 11/2008 |
| WO | 2009015409 | 2/2009 |
| WO | 2009108773 | 9/2009 |
| WO | 2010009343 | 1/2010 |
| WO | 2010045576 | 4/2010 |
| WO | 2010046532 | 4/2010 |
| WO | 2010069516 | 6/2010 |
| WO | 2010113129 | 10/2010 |
| WO | 2010121367 | 10/2010 |
| WO | 2011002822 | 1/2011 |
| WO | 2011091044 | 7/2011 |
| WO | 2011094859 | 8/2011 |
| WO | 2012151509 | 11/2012 |
| WO | 2012151521 | 11/2012 |
| WO | 2012151524 | 11/2012 |
| WO | 2012151526 | 11/2012 |
| WO | 2012151529 | 11/2012 |
| WO | 2012151531 | 11/2012 |
| WO | 2012151536 | 11/2012 |

OTHER PUBLICATIONS (Abstract) "Evaluation of materials for use in letdown valves for coal liquefaction service", Annual Conference on Materials for Coal Conversion and Utilization (CONF-791014), Oct. 9-11, 1979.

Merriam-Webster Dictionary, "Quench-Definition", document available at: http://www.merriam-webster.com/dictionary/quench Retreived on Feb. 9, 2012, Feb. 2, 2012, 1.

Adschiri et al., "Noncatalytic Conversion of Cellulose in Supercritical and Sub-Critical Water", Journal of Chemical Engineering of Japan, 1993, 26(6): 676-680.

Adschiri et al., "Cellulose hydrolysis in supercritical water to recover chemicals", Reaction Engineering for Pollution Prevention, 2000, 205-220.

Arai et al., "Biomass conversion in supercritical water for chemical recycle", Enerugi, Shigen, 16(2), 1995, 175-180 (Abstract).

Baek et al., "Optimization of the pretreatment of rice straw hemicellulosic hydrolyzates for microbial production of xylitol", Biotechnology and Bioprocess Engineering, 12(4), 2007, 404-409 (Abstract).

Balhouse , "Design, fabrication, and evaluation of a spiral-flow letdown valve", Electric Power Research Institute, Advanced Power Systems Division, EPRI AP, 1981, (Abstract).

Ballesteros et al., "Fractionation of *Cynara cardunculus* (cardoon) biomass by dilute-acid pretreatment", Applied Biochemistry and Biotechnology, 137-140, 2007, 239-252 (Abstract).

Bennett et al., "Chemicals from Forest Products by Supercritical Fluid Extraction", Fluid Phase Equil., 1983, 10:337.

Bicker et al., "Catalytic conversion of carbohydrates in subcritical water: A new chemical process for lactic acid production", Journal of Molecular Catalysis A: Chemical, 2005, 239:151-157.

Bobleter , "Hydrothermal Degradation and Fractionation of Saccharides and Polysaccharides", 1998.

Boocock et al., "Liquefaction of Biomass by Rapid Hydrolysis", Can. J. Chem. Eng., 1983, 61:80.

Bustos et al., "Modeling of the hydrolysis of sugar cane bagasse with hydrochloric acid", Applied Biochemistry and Biotechnology, 104(1), 2003, 51-68 (Abstract).

Carrasco et al., "SO2-catalyzed steam pretreatment and fermentation of enzymatically hydrolyzed sugarcane bagasse", Enzyme and Microbial Technology, 46(2), 2010, 64-73 (Abstract).

Carrasco et al., "Effects of dilute acid and steam explosion pretreatments on the cellulose structure and kinetics of cellulosic fraction hydrolysis by dilute acids in lignocellulosic materials", Applied Biochemistry and Biotechnology, 45-46, 1994, 23-34 (Abstract).
Carvalho et al., "Sugarcane bagasse hydrolysis with phosphoric and sulfuric acids and hydrolysate detoxification for xylitol production", Journal of Chemical Technology and Biotechnology, 79(11), 2004, 1308-1312 (Abstract).
Chamblee et al., "Reversible in situ acid formation for β-pinene hydrolysis using CO2 expanded liquid and hot water", Green Chemistry, 2004, vol. 6, 382-386.
Chen et al., "Study on dilute-acid pretreatment of corn stalk", Linchan Huaxue Yu Gongye, 29(2), 2009, 27-32 (Abstract).
Converti et al., "Wood hydrolysis and hydrolyzate detoxification for subsequent xylitol production", Chemical Engineering & Technology, 23(11), 2000, 1013-1020 (Abstract).
Dias et al., "Dehydration of xylose into fufural over micro-mesoporous sulfonic acid catalysts", Journal of Catalysis, 2005, vol. 229, 414-423.
Do Egito De Paiva et al., "Optimization of D-xylose, L-arabinose and D-glucose production obtained from sugar cane bagasse hydrolysis process", Brazilian Symposium on the Chemistry of Lignins and Other Wood Components, 6th, 2001, 333-337 (Abstract).
Dogaris et al., "Hydrothermal processing and enzymatic hydrolysis of sorghum bagasse for fermentable carbohydrates production", Bioresource Technology, 100(24), 2009, 6543-6549 (Abstract).
Eckert et al., "Supercritical fluid processing", Environmental Science and Technology, 1986, 20: 319-325.
Ehara et al., "A comparative study on chemical conversion of cellulose between the batch-type and flow-type in supercritical water", Cellulose, 2002, vol. 9, 301-311.
Ehara et al., "Characterization of the lignin-derived products from wood as treated in supercritical water", Journal of Wood Science, vol. 48, No. 4, Aug. 2002, pp. 320-325.
Ehara , "Chemical conversion of woody biomass by supercritical water", Graduate School of Energy Science, Kyoto University, Kyoto Japan.
Ehara et al., "Decomposition behavior of cellulose in supercritical water, subcritical water, and their combined treatments", J. Wood Sci., vol. 51, 2005, 148-153.
Ehrman , "Methods for the chemical analysis of biomass process streams", Handbook on Bioethanol, 1996, 395-415.
Erzengin et al., "Liquefaction of Sunflower Stalk by Using Supercritical Extraction", Energy Conversion and Management, Elsevier Science Publishers, Oxford, GB, Aug. 1998, 39:11, 1203-1206.
Garrote et al., "Manufacture of xylose-based fermentation media from corncobs by posthydrolysis of autohydrolysis liquors", Applied Biochemistry and Biotechnology, 95(3), 2001, 195-207 (Abstract).
Geddes et al., "Optimizing the saccharification of sugar cane bagasse using dilute phosphoric acid followed by fungal cellulases", Bioresource Technology, 101(6), 2010, 1851-1857 (Abstract).
Gong et al., "Study on hydrolysis and saccharification of microcrystalline cellulose in supercritical water", Xiandai Huagong, 30(2), 2010, 44-47 (Abstract).
Guirong et al., "Cellulose decomposition behavior in hot-compressed aprotic solvents", Science in China Series B: Chemistry, May 2008, vol. 51, No. 5, 479-486.
Hamelinck et al., "Ethanol from lignocellulosic biomass: techno-economic performance in short-, middle- and long-term", Biomass and Bioenergy, vol. 28, 2005, 384-410.
Harmer et al., "A new route to high yield sugars from biomass: phosphoric-sulfuric acid", Chemical Communications, vol. 43, 2009, 6610-6612 (Abstract).
Herrera et al., "Production of Xylose from Sorghum Straw Using Hydrochloric Acid", Journal of Cereal Science, 37(3), 2003, 267-274 (Abstract).
Holgate et al., "Glucose Hydrolysis and Oxidation in Supercritical Water", AIChE Journal, 1995, 41(3), 637-648.
Hosaka , "Filtration of lignin in hydrolysis solution", Hiroshima Daigaku Suichikusangakubu Kiyo, 17(1), 1978, 17-25 (Abstract).
Houghton et al., "Reactivity of Some Organic Compounds with Supercritical Water", Fuel, 1986, 61:827.
Ioannidou et al., "Direct determination of toxic trace metals in honey and sugars using inductively coupled plasma atomic emission spectrometry", Talanta, 65(1), 2005, 92-97.
Jensen et al., "Effects of dilute acid pretreatment conditions on enzymatic hydrolysis monomer and oligomer sugar yields for aspen, balsam, and switchgrass", Bioresource Technology, 101(7), 2010, 2317-2325 (Abstract).
Jeong et al., "Optimizing dilute-acid pretreatment of rapeseed straw for extraction of hemicellulose", Applied Biochemistry and Biotechnology, 161(1-8), 2010, 22-33 (Abstract).
Jiang et al., "A method for quick analysis of biomass chemical composition from element analysis", Huagong Xuebao (Chinese Edition), 61(6), 2010, 1506-1509 (Abstract).
Kamada et al., "Development of letdown valve on pilot plant", Sekitan Kagaku Kaigi Happyo Ronbunshu, 35th, 1998, 459-462 (Abstract).
Kamm et al., "Principles of biorefineries", Appl. Microbiol. Biotechnol, vol. 64., 2004, 137-145.
Karimi et al., "Conversion of rice straw to sugars by dilute-acid hydrolysis", Biomass and Bioenergy, 30(3), 2006, 247-253 (Abstract).
Kim et al., "Selective Synthesis of Furfural from Xylose with Supercritical Carbon Dioxide and Solid Acid Catalyst", Journal of Industrial and Engineering Chemistry, The Korean Society of Industrial and Engineering Chemistry, Korea, 2001, 7(6); 424-429.
Kirk-Othmer , "Supercritical Fluids", Encyclopedia of Chemical Technology 3rd ed., John Wiley & Sons, New York.
Knopf et al., "Reactive Extraction of Lignin from Biomass Using Supercritical Ammonia-Water Mixtures", J. Supercritical Fluids, 1993, 6: 249-254.
Kupianen et al., "Comparison of formic and sulfuric acids as a glucose decomposition catalyst", Ind. Eng. Chem. Res., 49(18), 2010, 8444-8449 (Abstract).
Lee et al., "Hydrolysis of cellulose under subcritical and supercritical water using continuous flow system", Hwahak Konghak, 39(2), 2001, 257-263 (Abstract).
Levai , "Atom spectrometric methods for determination of trace metal impurities in pharmaceutical substances", Acta Pharmaceutica Hungarica, 71(3), 2001, 350-356 (Abstract).
Li et al., "Interaction of Supercritical Fluids with Lignocellulosic Materials", Industrial Engineering Chemistry Research, American Chemical Society Res., Jul. 1988, 27(7):1301-1312.
Li , "Analysis of failure cause in CCI pressure reducing valves used in product pipeline", Guandao Jishu Yu Shebei, (5), 2008, 34-36 (Abstract).
Li et al., "Studies of Monosaccharide Production through Lignocellulosic Waste Hydrolysis Using Double Acids", Energy & Fuelds, 22(3), 2008, 2015-2021 (Abstract).
Li et al., "Improvement on technology of extracting xylose from the corncobs by acid method", Shipin Gongye Keji, 30(6), 2009, 263-264 (Abstract).
Li et al., "Fructose decomposition kinetics in organic acides-enriched high termperature liquid water", Biomass and Bioenergy, vol. 33, Issue 9, Sep. 2009, 1182-1187.
Li et al., "Study on the recovery of lignin from black liquor by ultrafiltration", Huaxue Gongcheng, 31(1), 2003, 49-52 (Abstract).
Lloyd et al., "Combined sugar yields for dilute sulfuric acid pretreatment of corn stover followed by enzymatic hydrolysis of the remaining solids", Bioresource Technology, 96(18), 2005, 1967-1977 (Abstract).
Lopez et al., "Chemical characterization and dilute-acid hydrolysis of rice hulls from an artisan mill", BioResources, 5(4), 2010, 2268-2277 (Abstract).
Lu et al., "Decomposition of Cellulose to Produce 5-hydroxymethyl-furaldehyde in Subcritical Water", Abstract of Transactions of Tranjin University, STN Accession No. 2008:1016799, Document No. 151:427986, 2008, 14(3), 198-201.
Lu et al., "Optimization of H2SO4-catalyzed hydrothermal pretreatment of rapeseed straw for bioconversion to ethanol: focusing on pretreatment at high solids content", Bioresource Technology, 100(12), 2009, 3048-3053 (Abstract).

Luterbacher et al., "High-Solids Biphasic CO2-H2O Pretreatment of Lignocellulosic Biomass", Biotechnology and Bioengineering, 107(3), 2010, 451-460 (Abstract).
Malaluan et al., "Biomass conversion in supercritical water", Off. Proc. Comb. Conf., 6th Conf. Asia Pac. Confed. Chem. Eng., 21st Australas. Chem. Eng. Conf., vol. 1 (Publisher: Inst. Eng., Aus., Barton, Australia), 1993, 209/1-214/1 (Abstract).
Marchessault et al., "A New Understanding of the Carbohydrate System", Future Sources of Organic Raw Materials, 1980, 613-625.
Marone et al., "Comminution of hydrolytic lignin in a jet mill", Gidroliznaya i Lesokhimicheskaya Promyshlennost, (6), 1991, 14-15 (Abstract).
Matsumura et al., "Supercritical Water Treatment of Biomass for Energy and Material Recovery", Combust. Sci. and Tech., 2006, 178:509-536.
Matsunaga et al., "Super-rapid chemical conversion of sugi wood by supercritical and subcritical water treatment", Mokuzai Gakkaishi, 50(5), 2004, 325-332 (Abstract).
McCoy et al., "Extraction of Lignin from Biomass with Supercritical Alcohol", J. Supercritical Fluids, 1989, 2:80-84.
McHugh et al., "Supercritical Fluid Extraction : Principles and Practice", Butterworths, 1986, pp. 293-310.
McWilliams et al., "Comparison of aspen wood hydrolysates produced by pretreatment with liquid hot water and carbonic acid", Applied Biochemistry and Biotechnology, 98-100, 2002, 109-121 (Abstract).
Miller-Ihli et al., "Direct determination of lead in sugars using graphite furnace atomic absorption spectrometry", Atomic Spectroscopy, 14(4), 1993, 85-9.
Miyazawa et al., "Polysaccharide Hydrolysis Accelerated by Adding Carbon Dioxide under Hydrothermal Conditions", Biotechnol. Prog ., 2005, 21: 1782-1785.
Modell et al., "Supercritical Water Oxidation of Pulp Mill Sludges", TAPPI J., 1992, 75:195.
Mok et al., "Dilute acid hydrolysis of biopolymers in a semi-batch flow reactor at supercritical pressure", Energy from Biomass and Wastes, 13, 1990, 1329-1347 (Abstract).
Moreschi et al., "Hydrolysis of Ginger Bagasse Starch in Subcritical Water and Carbon Dioxide", Journal of Agricultural and Food Chemistry, 2004, 52(6), 1753-1758.
Mosier et al., "Optimization of pH controlled liquid hot water pretreatment of corn stover", Bioresource Technology, 96(18), 2005, 1986-1992 (Abstract).
Mosier et al., "Characterization of Acid Catalytic Domains for Cellulose Hydrolysis and Glucose Degradation", Biotechnology and Bioengineering, vol. 79, No. 6, Sep. 20, 2002, 610-618.
Nakata et al., "Bioethanol from cellulose with supercritical water treatment followed by enzymatic hydrolysis", Applied Biochemistry and Biotechnology, 129-132, 2006, 476-485 (Abstract).
Napradean et al., "Studies regarding cadmium determination by atomic absorption spectrometry. Note II. Pharmaceutical finished products", Farmacia, 53(2), 2005, 86-90 (Abstract).
Neureiter et al., "Dilute acid hydrolysis of presscakes from silage and grass to recover hemicellulose-derived sugars", Bioresource Technology, 92(1), 2004, 21-29 (Abstract).
Neureiter et al., "Dilute-acid hydrolysis of sugarcane bagasse at varying conditions", Applied Biochemistry and Biotechnology, 98-100, 2002, 49-58 (Abstract).
Nunn et al., "Product compositions and kinetics in the rapid pyrolysis of milled wood lignin", Industrial & Engineering Chemistry Process Design and Development, vol. 24, Jul. 1985, pp. 844-852.
Ogihara et al., "Direct observation of cellulose dissolution in subcritical and supercritical water over a wide range of water densities (500-1000 kg/m3)", Cellulose, 2005, 12:595-606.
Osada et al., "Low Temperature Catalytic Gasification of Lignin and Cellulose with a Ruthenium Catalyst in Supercritical Water", Energy Fuels, 2004, 18: 327-333.
Parajo et al., "Pre-hydrolysis of Eucalyptus wood with dilute sulfuric acid: operation in autoclave", Holz als Roh-und Werkstoff, 52(2), 1994, 102-8 (Abstract).
Park et al., "Kinetics of cellulose decomposition under subcritical and supercritical water in continuous flow system", Korean Journal of Chemical Engineering, 19(6), 2002, 960-966 (Abstract).
Pasquini et al., "Sugar cane bagasse pulping using supercritical CO2 associated with co-solvent 1-butanol/water", J. of Supercritical Fluids, vol. 34, 2005, 125-134.
Pasquini et al., "Extraction of lignin from sugar cane bagasse and Pinus taeda wood chips using ethanol-water mixtures and carbon dioxide at high pressures", Journal of Supercritical Fluids, PRA Press, US, Nov. 2005, 36(1); 31-39.
Persson et al., "Supercritical Fluid Extraction of a Lignocellulosic Hydrolysate of Spruce for Detoxification and to Facilitate Analysis of Inhibitors", Biotechnology and Bioengineering, Wiley & Sons , Hoboken, NJ, US, Sep. 20, 2002, 79(6): 694-700.
Pessoa, Jr. et al., "Acid hydrolysis of hemicellulose from sugarcane bagasse", Brazilian Journal of Chemical Engineering, 14(3), 1997, 291-297 (Abstract).
Peter et al., "High Pressure Extraction of Lignin from Biomass", Supercritical Fluid Technology, 1985, p. 385.
Pohl et al., "Direct determination of the total concentrations of magnesium, calcium, manganese, and iron in addition to their chemical and physical fractions in dark honeys", Analytical Letters, 44(13), 2011, 2265-2279.
Ramirez et al., "Mathematical modelling of feed pretreatment for bioethanol production", Computer-Aided Chemical Engineering, vol. 26, 2009, 1299-1304 (Abstract).
Rao et al., "Pyrolysis Rates of Biomass Materials", Energy, 1998, 23:973-978.
Roberto et al., "Dilute-acid hydrolysis for optimization of xylose recovery from rice straw in a semi-pilot reactor", Industrial Crops and Products, 17(3), 2003, 171-176 (Abstract).
Saito et al., "The Investigation of Degradation Reaction of Various Saccharides in High Temperature and High Pressure Water", Journal of Physics:Cinference Series, 2008, 121.
Saka et al., "Chemical conversion of biomass resources to useful chemicals and fuels by supercritical water treatment", Bridgewater AV(ed) Progress in Thermocritical Biomass Conversion. Blackwell, Oxford, 2001, 1338-1348.
Saka , "Supercritical fluids to biomass research", Cellulose Communications, 5(3), 1998, 129-135 (Abstract).
Saka et al., "Supercritical fluids to biomass reserach (II)", Cellulose Communications, 9(3), 2002, 137-143 (Abstract).
Saka et al., "Chemical conversion of various celluloses to glucose and its derivatives in supercritical water", Cellulose Communications, 6(3), 1999, 177-191.
Sako , "Kinetic study of furfural formation accompanying supercritical carbon dioxide extraction", Journal of Chemical Engineering of Japan, Society of Chemical Engineers, Aug. 1, 1992, 25(4):372-377.
Sanchez et al., "Dilute-acid hydrolysis for fermentation of the Bolivian straw material Paja Brava", Bioresource Technology, 93(3), 2004, 249-256 (Abstract).
Sangarunlert et al., "Furfural production by acid hydrolysis and supercritical carbon dioxide extraction from rice husk", Korean Journal of Chemical Engineering, 2007, 24(6): 936-941.
Sarrouh et al., "Biotechnological production of xylitol: enhancement of monosaccharide production by post-hydrolysis of dilute acid sugarcane hydrolysate", Applied Biochemistry and Biotechnology, 153(1-3), 2009, 163-170 (Abstract).
Sasaki et al., "Cellulose Hydrolysis in Sub-Critical and Supercritical Water", Journal of Supercritical Fluids, 1998, 13:261-268.
Sasaki et al., "Direct hydrolysis of cellulose to glucose using ultra-high temperature and pressure steam explosion", Carbohydrate Polymers 89, 2012, 298-301.
Sasaki et al., "Rapid and selective conversion of cellulose to valuable chemical intermediates using supercritical water", Proc. 6th international Symposium on Supercritical Fluids, Tome 2, 2003, 1417-1422.
Sasaki et al., "Super-rapid enzymatic hydrolysis of cellulose with supercritical water solubilization pretreatment", Kobunshi Ronbunshu, 58(10), 2001, 527-532.
Sasaki et al., "Dissolution and Hydrolysis of Cellulose in Subcritical and Supercritical Water", Industrial & Engineering Chemistry Research, 39(8), 2000, 2883-2890 (Abstract).
Sasaki et al., "Kinetics of cellulose conversion at 25 MPa in sub-and supercritical water", AIChE Journal, 50(1), 2004, 192-202.

Saucedo-Luna et al., "Optimization of acid hydrolysis of bagasse from Agave tequilana Weber", Revista Mexicana de Ingenieria Quimica, 9(1), 2010, 91-97 (Abstract).

Schacht et al., "From plant materials to ethanol by means of supercritical fluid technology", J. of Supercritical Fluids, vol. 46, 2008, 299-321.

Sera et al., "Development of saccharification techniques for cellulosic biomass", Hitz Giho, 68(2), 2008, 40-45 (Abstract).

Shikinaka et al., "Polyfunctional nanometric particles obtained from lignin, a woody biomass resource", Green Chemistry, 12(11), 2010, 1914-1916 (Abstract).

Sina et al., "Key Compounds of the Hydropyrolysis of Glucose in Supercritical Water in the Presence of K2CO3", Ind. Eng. Chem. Res., 2003, 42(15), 3516-3521.

Soederstroem et al., "Effect of Washing on Yield in One- and Two-Step Steam Pretreatment of Softwood for Production of Ethanol", Biotechnology Progress, 20(3), 2004, 744-749 (Abstract).

Sokolov et al., "Activation of hydrolytic lignin obtained from corncobs", Kozharska i Obuvna Promishlenost, 13(6), 1972, 13-23 (Abstract).

Spigno et al., "Cellulose and hemicelluloses recovery from grape stalks", Bioresource Technology, 99(10), 2008, 4329-4337 (Abstract).

Springer , "Prehydrolysis of hardwoods with dilute sulfuric acid", Industrial & Engineering Chemistry Product Research and Development, 24(4), 1985, 614-23 (Abstract).

Srinivasan et al., "Pretreatment of Guayule Biomass Using Supercritical Carbon Dioxide-Based Method", Bioresource Technology, 101(24), 2010, 9785-9791.

Srokol et al., "Hydrothermal upgrading of biomass to biofuel; studies on some monosacchride model compounds", Carbohydrate Research, 339(10), 2004, 1717-1726 (Abstract).

Steinke , "Valve solutions for high-pressure letdown", Proceedings of the Symposium on Instrumentation for the Process Industries, 44th, 1989, 39-43 (Abstract).

Steinke et al., "Valve solutions for high pressure letdown", Advances in Instrumentation, 42(3), 1987, 1381-1390 (Abstract).

Strobel et al., "Carbohydrate Transport by the Anaerobic Thermophile *Clostridium thermocellum* LQRI", Applied and Environmental Microbiology, Nov. 1995, 4012-4015.

Suitor et al., "Development of a coal slurry letdown valve", American Society of Mechanical Engineers, Fluids Engineering Division, vol. 23, 1985, 142-144 (Abstract).

Sukhanovskii et al., "The chemical composition of the organic part and of ash in hydrolysis lignins", Gidroliznaya i Lesokhimicheskaya Promyshlennost, 18(5), 1965, 15-17 (Abstract).

Svitel'Skii , "Study of ash in lignin from kraft mill effluents", Mater. Nauch.-Tekh. Konf. Leningrad. Lesotekh. Akad., No. 4, 1966, 180-185 (Abstract).

Terol et al., "High-temperature liquid chromatography inductively coupled plasma atomic emission spectrometry hyphenation for the combined organic and inorganic analysis of foodstuffs", Journal of Chromatography, 1217(40), 2010, 6195-6202.

Trickett et al., "Dilute acid hydrolysis of bagasse hemicellulose", ChemSA, 8(3), 1982, 11-15 (Abstract).

Um et al., "Acid Hydrolysis of Hemicellulose in Green Liquor Pre-Pulping Extract of Mixed Northern Hardwoods", Appl. Biochem Biotechnol,153(1-3), 2009, 127-38.

Van Walsum et al., "Carbonic acid enhancement of hydrolysis in aqueous pretreatment of corn stover", Bioresource Technology, 93(3), 2004, 217-226 (Abstract).

Van Walsum , "Severity function describing the hydrolysis of xylan using carbonic acid", Applied Biochemistry and Biotechnology, 91-93, 2001, 317-329 (Abstract).

Varga et al., "Optimization of steam pretreatment of corn stover to enhance enzymatic digestibility", Applied Biochemistry and Biotechnology, 113-116, 2004, 509-523 (Abstract).

Veres et al., "Studies on matrix effects in the determination of the metal content of sugar complexes by atomic absorption spectrometry", Magyar Kemiai Folyoirat, 93(5), 1987, 199-204 (Abstract).

Vick Roy et al., "Biomass hydrolysis with sulfur dioxide and water in the region of the critical point", Process Technology Proceedings, 3 Supercrit. Flud Technol., 1985, 397-444 (Abstract).

Wiboonsiriku et al., "Properties of Extracts from Defatted Rice Bran by its Subcritical Water Treatment", Journal of Agricultural and Food Chemistry, 2007, 55(21), 8759-8765.

Wu et al., "Determination of trace calcium in glucose by Zeeman flame atomic absorption spectrometry", Guangdong Weiliang Yuansu Kexue, 14(3), 2007, 58-60 (Abstract).

Yang et al., "Steaming extraction of corncob xylan for production of xylooligosaccharide", Wuxi Qinggong Daxue Xuebao, 17(4), 1998, 50-53 (Abstract).

Yee et al., "Improvement of xylose production by acid hydrolysis of bagasse pith with low liquor ratio", Taiwan Tangye Yanjiuso Yanjiu Huibao, 98, 1982, 59-70 (Abstract).

Yoshida et al., "Gasification of Biomass Model Compound and Real Biomass in Supercritical Water", Biomass and Bioenergy, 2004, 26:71-78.

Yu et al., "Characteristics and Precipitation of Glucose Oligomers in the Fresh Liquid Products Obtained from the Hydrolysis of Cellulose in", Hot-Compressed Water, Industrial & Engineering Chemistry Research, 48(23), 2009, 10682-10690 (Abstract).

Zhang et al., "Cellulose utilization by *Clostridium thermocellum*: Bioenergetics and hydrolysis product assimilation", PNAS, May 17, 2005, 7321-7325.

Zhao et al., "Supercritical hydrolysis of cellulose for oligosaccharide production in combined technology", Chemical Engineering Journal, Aug. 1, 2009, 150(2):411-417.

Zhao et al., "Fermentable hexose production from corn stalks and wheat straw with combined supercritical and subcritical huydrothermal technology", Bioresource Technology, 100(23), 2009, 5884-5889 (Abstract).

Zhao et al., "Supercritical pretreatment and hydrolysis of cellulose", Huaxue Xuebao, 66(20), 2008, 2295-2301 (Abstract).

Zhao et al., "Combined supercritical and subcritical process for cellulose hydrolysis to fermentable hexoses", Environmental Science & Technology, 43(5), 2009, 1565-1570.

Zhuang et al., "Research on biomass hydrolysis under extremely low acids by HPLC", Taiyangneng Xuebao, 28(11), 2007, 1239-1243 (Abstract).

U.S. Appl. No. 13/464,453, "Notice of Allowance", mailed Oct. 9, 2012, 12 pages.

U.S. Appl. No. 13/479,852, "Non-Final Office Action", mailed Oct. 12, 2012, 9 pages.

U.S. Appl. No. 13/479,852, "Notice of Allowance", mailed Dec. 5, 2012, 9 pages.

U.S. Appl. No. 13/472,798, "Final Office Action" mailed Dec. 3, 2012, 29 pages.

International Patent Application No. PCT/US2012/036600, "International Search Report and Written Opinion", Nov. 23, 2012, 9 pages.

* cited by examiner

SELF-CLEANING APPARATUS AND METHOD FOR THICK SLURRY PRESSURE CONTROL

CROSS-REFERENCE TO RELATED APPLICATIONS

This application is a divisional of U.S. application Ser. No. 13/366,651, filed Feb. 6, 2012, currently pending, which claims the benefit of U.S. application Ser. No. 61/482,449, filed May 4, 2011, the entire disclosures of which are incorporated herein by reference.

FIELD OF THE INVENTION

The present invention generally relates to apparatus and methods for handling viscous fluids. More particularly, it relates to self-cleaning apparatus and methods for handling viscous fluids, such as thick slurries of lignocellulosic biomass and its components, under high pressure.

BACKGROUND OF THE INVENTION

Backpressure control is critical to maintaining process conditions. However, with solid-liquid slurries, clogging of valves and orifices is a challenge. In addition, back pressure control valves cannot respond quickly enough and completely reseal to avoid bleed-through. Process pressure variations must be minimized to maintain process control. Thus, it would be beneficial to develop an efficient and reliable means for handling fouling fluids, such as thick solid-liquid slurries of lignocellulosic biomass and its components, under high pressure that minimize clogging, including, but not limited to those processed with compressible supercritical or near-critical fluids. The apparatus of methods of the present invention are directed toward these, as well as other, important ends.

SUMMARY OF THE INVENTION

In one embodiment, the invention is directed to self-cleaning apparatus for processing of a fouling fluid under pressure, comprising:

- a passageway having at least two stages;
- a retractable valve positioned in each of said at least two stages; and
- an optional shutoff valve positioned in said passageway;
- wherein said retractable valves form a tortuous path in said passageway when said retractable valves are partially closed to permit a pressure drop between said stages; and
- wherein at least one of said retractable valves is capable of being in an open position when the other of said retractable valves are partially closed.

In another embodiment, the invention is directed to methods for reducing fouling in processing of lignocellulolosic biomass, comprising:

- providing a fouling fluid under pressure in an apparatus comprising:
  - a passageway having at least two stages;
  - a retractable valve positioned in each of said at least two stages; and
  - an optional shutoff valve positioned in said passageway;
  - wherein said retractable valves form a tortuous path in said passageway when said retractable valves are partially closed to permit a pressure drop between said stages; and
- retracting at least one of said retractable valves to an open position to form an open retractable valve when the other of said retractable valves are partially closed to clean said open retractable valve and to control pressure in said apparatus.

In yet another embodiment, the invention is directed to methods for controlling back-pressure in processing of lignocellulolosic biomass, comprising:

- providing a fouling fluid under pressure in an apparatus comprising:
  - a passageway having at least two stages;
  - a retractable valve positioned in each of said at least two stages; and
  - an optional shutoff valve positioned in said passageway;
  - wherein said retractable valves form a tortuous path in said passageway when said retractable valves are partially closed to permit a pressure drop between said stages; and
- retracting at least one of said retractable valves to an open position to form an open retractable valve when the other of said retractable valves are partially closed to clean said open retractable valve and to control pressure in said apparatus.

In further embodiments, the invention is directed to systems for processing fouling fluids, comprising:

- at least one self-cleaning apparatus described herein; and tortuous path piping;
- wherein said piping is upstream of said at least one self-cleaning apparatus.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1A:
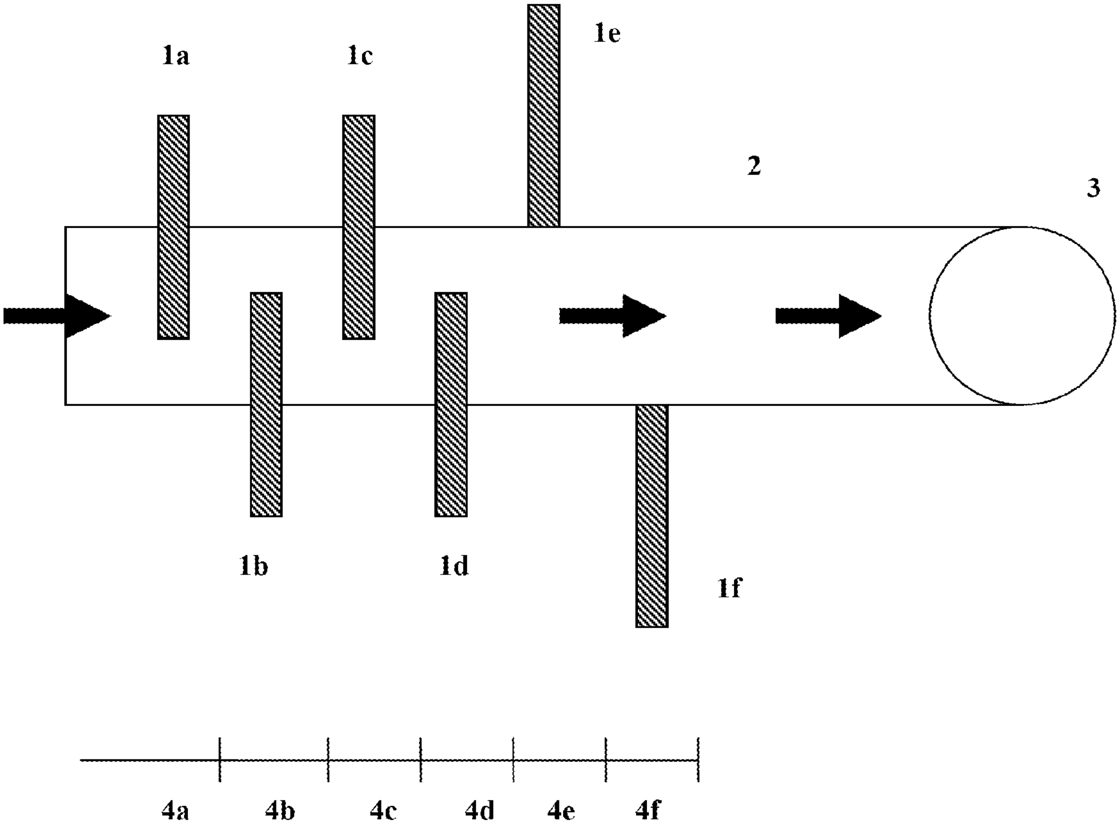
FIG. 1A is a schematic diagram using six retractable knife valves in one embodiment of the invention.

As employed above and throughout the disclosure, the following terms, unless otherwise indicated, shall be understood to have the following meanings As used herein, the singular forms "a," "an," and "the" include the plural reference unless the context clearly indicates otherwise.

While the present invention is capable of being embodied in various forms, the description below of several embodiments is made with the understanding that the present disclosure is to be considered as an exemplification of the invention, and is not intended to limit the invention to the specific embodiments illustrated. Headings are provided for convenience only and are not to be construed to limit the invention in any manner. Embodiments illustrated under any heading may be combined with embodiments illustrated under any other heading.

The use of numerical values in the various quantitative values specified in this application, unless expressly indicated otherwise, are stated as approximations as though the minimum and maximum values within the stated ranges were both preceded by the word "about." In this manner, slight variations from a stated value can be used to achieve substantially the same results as the stated value. Also, the disclosure of ranges is intended as a continuous range including every value between the minimum and maximum values recited as well as any ranges that can be formed by such values. Also disclosed herein are any and all ratios (and ranges of any such ratios) that can be formed by dividing a recited numeric value into any other recited numeric value. Accordingly, the skilled person will appreciate that many such ratios, ranges, and ranges of ratios can be unambiguously derived from the numerical values presented herein and in all instances such ratios, ranges, and ranges of ratios represent various embodiments of the present invention.

A supercritical fluid is a fluid at a temperature above its critical temperature and at a pressure above its critical pressure. A supercritical fluid exists at or above its "critical point," the point of highest temperature and pressure at which the liquid and vapor (gas) phases can exist in equilibrium with one another. Above critical pressure and critical temperature, the distinction between liquid and gas phases disappears. A supercritical fluid possesses approximately the penetration properties of a gas simultaneously with the solvent properties of a liquid. Accordingly, supercritical fluid extraction has the benefit of high penetrability and good solvation.

Reported critical temperatures and pressures include: for pure water, a critical temperature of about 374.2° C., and a critical pressure of about 221 bar; for carbon dioxide, a critical temperature of about 31° C. and a critical pressure of about 72.9 atmospheres (about 1072 psig). Near-critical water has a temperature at or above about 300° C. and below the critical temperature of water (374.2° C.), and a pressure high enough to ensure that all fluid is in the liquid phase. Sub-critical water has a temperature of less than about 300° C. and a pressure high enough to ensure that all fluid is in the liquid phase. Sub-critical water temperature may be greater than about 250° C. and less than about 300° C., and in many instances sub-critical water has a temperature between about 250° C. and about 280° C. The term "hot compressed water" is used interchangeably herein for water that is at or above its critical state, or defined herein as near-critical or sub-critical, or any other temperature above about 50° C. (preferably, at least about 100° C.) but less than subcritical and at pressures such that water is in a liquid state As used herein, a fluid which is "supercritical" (e.g. supercritical water, supercritical $CO_2$, etc.) indicates a fluid which would be supercritical if present in pure form under a given set of temperature and pressure conditions. For example, "supercritical water" indicates water present at a temperature of at least about 374.2° C. and a pressure of at least about 221 bar, whether the water is pure water, or present as a mixture (e.g. water and ethanol, water and $CO_2$, etc). Thus, for example, "a mixture of sub-critical water and supercritical carbon dioxide" indicates a mixture of water and carbon dioxide at a temperature and pressure above that of the critical point for carbon dioxide but below the critical point for water, regardless of whether the supercritical phase contains water and regardless of whether the water phase contains any carbon dioxide. For example, a mixture of sub-critical water and supercritical $CO_2$ may have a temperature of about 250° C. to about 280° C. and a pressure of at least about 225 bar.

As used herein, "continuous" indicates a process which is uninterrupted for its duration, or interrupted, paused or suspended only momentarily relative to the duration of the process. Treatment of biomass is "continuous" when biomass is fed into the apparatus without interruption or without a substantial interruption, or processing of said biomass is not done in a batch process.

As used herein, "lignocellulosic biomass or a component part thereof" refers to plant biomass containing cellulose, hemicellulose, and lignin from a variety of sources, including, without limitation (1) agricultural residues (including corn stover and sugarcane bagasse), (2) dedicated energy crops, (3) wood residues (including sawmill and paper mill discards), and (4) municipal waste, and their constituent parts including without limitation, lignocellulose biomass itself, lignin, $C_6$ saccharides (including cellulose, cellobiose, $C_6$ oligosaccharides, $C_6$ monosaccharides, and $C_5$ saccharides (including hemicellulose, $C_5$ oligosaccharides, and $C_5$ monosaccharides).

As used herein, "passageway" refers to a hollow chamber of any general cross-section, including varying cross-sections, used for conveying a material.

As used herein with reference to a valve, "open" means that the valve permits at least partial flow through the passageway. As used herein with reference to a valve, "closed" means that the valve permits no flow through the passageway. As used herein with reference to a "open" or "closed" valve, "partial" or "partially" means that the valve is not in its fully open or fully closed position, respectively, and therefore permits at least some flow through the passageway. "Partially open" and "partially closed" may be used interchangeably.

As used herein, "fouling fluid" refers to fluid, including a viscous liquid under the pressure and/or temperature conditions and solid-liquid slurries, that stick to the surfaces of the equipment in which it is in contact causing fouling of small passageways and orifices.

As used herein, "tortuous" refers to a path having more than one twists, bends, or turns.

As discussed above, backpressure control is critical to maintaining process conditions. However, with solid-liquid slurries, clogging of valves and orifices is a challenge. In addition, back pressure control valves cannot respond quickly enough and completely reseal to avoid bleed-through. Process pressure variations must be minimized to maintain process control. In the hydraulics of a system, a pump adds mechanical energy to the fluid to increase its pressure. The friction of the fluid along the pipes, valves, reactors and other components creates a pressure drop. Some friction losses are fixed, for example through a constant diameter pipe. Some pressure losses vary, for example through a valve whose opening is varied (large valve opening=less pressure loss). So pressure drop may be controlled by opening or closing the valve. A tortuous piping path is simply a way to increase the pressure drop in a shorter length. By making the piping path tortuous (many turns, twists, etc.), the pressure drop is greater The pressure drop can be designed in a piping system, but once they are installed, the pressure drop is fixed (since the pipes do not move). A partial blockage in the system will also create a pressure drop, that may be temporary if the partial blockage is eliminated. Thus, controlling the friction of the system is how the apparatus and methods of the invention compensate for sudden or temporary pressure changes due to the slurry blocking and hanging up somewhere along the system. If the fluid were water, the pressure losses in the system would be very stable, and a control valve at the back would probably be set in one position and never be touched. In the case of slurries, the pressure losses in the system fluctuate because of variations in consistency of the slurry (clumps), variations in viscosity, variations in temperature, and the like. What is needed is an apparatus and methods that permit constant adjustment of the positions of the valves to optimize the pressure drop across them. Retractable valves, especially those arranged in an alternating fashion which create in a tortuous path for the flow of material, that are partially open (or partially closed) create pressure drops. The retractable valves may be completely opened, thereby cleaning the valve and valve orifices and preventing a build up of solids in the passageway, especially when processing viscous fluids and slurries. The apparatus and methods of the invention, therefore, utilize retractable valves to overcome the issues associated with backpressure control by forming a valve array to provide the back pressure control.

Accordingly, in one embodiment, the invention is directed to self-cleaning apparatus for processing of a fouling fluid under pressure, comprising:

a passageway having at least two stages;

a retractable valve positioned in each of said at least two stages; and an optional shutoff valve positioned in said passageway;

wherein said retractable valves form a tortuous path in said passageway when said retractable valves are partially closed to permit a pressure drop between said stages; and wherein at least one of said retractable valves is capable of being in an open position when the other of said retractable valves are partially closed.

The retractable valves that are used only when the primary retractable valves forming the tortuous path for the flow of material are opened for cleaning are referred to alternatively as "redundant" retractable valves. It is contemplated that certain retractable valves may be dedicated for use only when the other retractable valves are open for cleaning It is also contemplated, however, that all of the retractable valves may at one time or another be considered a redundant valve. The apparatus of the invention may be used advantageously for processing/transporting solid-liquid slurry after fractionation of biomass and/or cellulose hydrolysis.

Figure 1B:
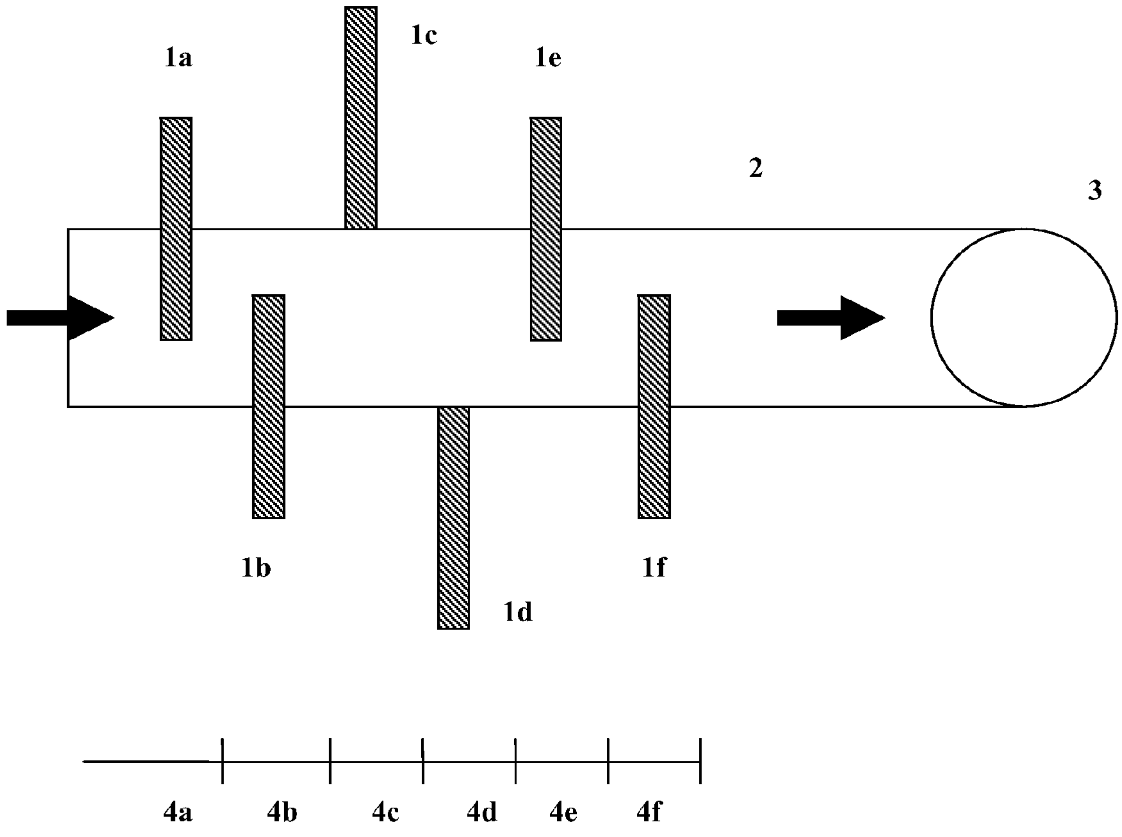
FIG. 1B is a schematic diagram using six retractable knife valves in one embodiment of the invention.

On embodiment of the self-cleaning apparatus is schematically shown in FIG. 1A, using six retractable knife valves 1*a*, 1*b*, 1*c*, 1*d*, 1*e*, and if in six stages (4*a*, 4*b*, 4*c*, 4*d*, 4*e*, and 4*f*, respectively) in passageway 2. In this figure, four of the retractable knife valves 1*a*, 1*b*, 1*c*, and 1*d*, are in a partially open position creating a tortuous path for the flow of material and two of the retractable knife valves le and if are in a fully open position. In FIG. 1B, knife valves 1*c* and 1*d* are opened fully in order to clean them, while knife valves 1*e* and 1*f* are partially closed to take over the duties of the former two. In effect, four of the retractable knife valves 1*a*, 1*b*, 1*e*, and 1*f*, are in a now partially open position creating a tortuous path for the flow of material and two other of the retractable knife valves 1*c*, and 1*d* are in a fully open position. A separate shutoff valve, here shown as a cone valve 3, may be present for full shut-off.

Figure 2:
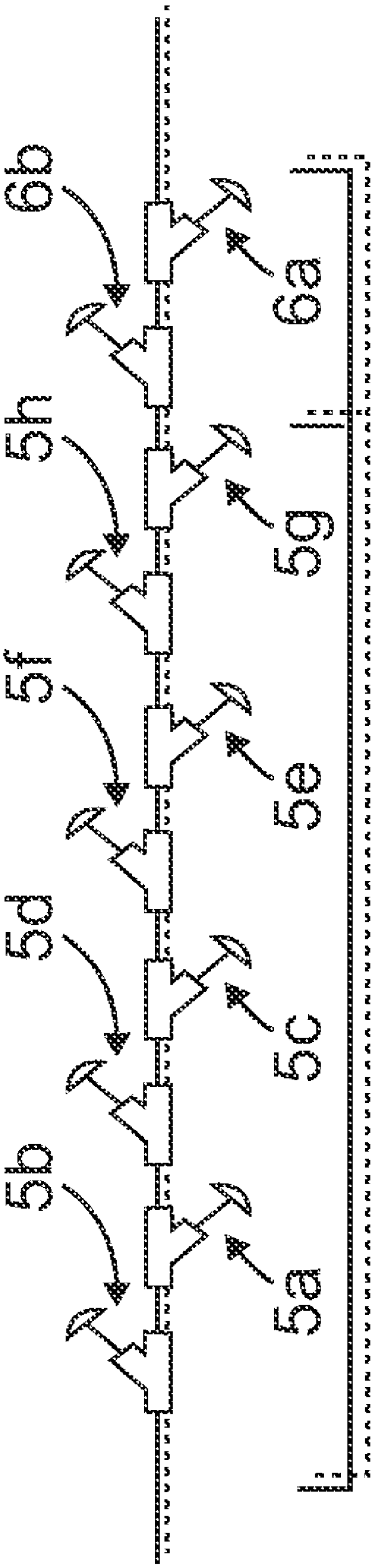
FIG. 2 is a schematic diagram using ten retractable valves in one embodiment of the invention.

FIG. 2 is a schematic diagram using ten retractable valves in one embodiment of the invention. Stages 1 to 8 (5*a*, 5*b*, 5*c*, 5*d*, 5*e*, 5*f*, 5*g*, and 5*h*, where Stage 1 corresponds to 5*a* and Stage 8 corresponds to 5*h*) create the initial pressure letdown and Stages A and B (6*a* and 6*b*, respectively) allow in-line cleaning for a total of ten stages with ten retractable valves. Flow of materials begins in Stage 1 and ends after Stage B. Stages A and B are redundant valves that permit for opening and cleaning of any two valves in the system (including Stages A and B) while the remaining valves are partially closed.

In another embodiment, the invention is directed to methods for reducing fouling in processing of lignocellulolosic biomass, comprising:

providing a fouling fluid under pressure in an apparatus comprising:

a passageway having at least two stages;

a retractable valve positioned in each of said at least two stages; and an optional shutoff valve positioned in said passageway;

wherein said retractable valves form a tortuous path in said passageway when said retractable valves are partially closed to permit a pressure drop between said stages;

retracting at least one of said retractable valves to an open position to form an open retractable valve when the other of said retractable valves are partially closed to clean said open retractable valve and to control pressure in said apparatus.

In yet another embodiment, the invention is directed to methods for controlling back-pressure in processing of lignocellulolosic biomass, comprising:

providing a fouling fluid under pressure in an apparatus comprising:

a passageway having at least two stages;

a retractable valve positioned in each of said at least two stages; and an optional shutoff valve positioned in said passageway;

wherein said retractable valves form a tortuous path in said passageway when said retractable valves are partially closed to permit a pressure drop between said stages; and retracting at least one of said retractable valves to an open position to form an open retractable valve when the other of said retractable valves are partially closed to clean said open retractable valve and to control pressure in said apparatus.

In further embodiments, the invention is directed to systems for processing viscous fluids, comprising:

at least one self-cleaning apparatus described herein; and tortuous path piping;

wherein said piping is upstream of said at least one self-cleaning apparatus.

In certain embodiments, the retractable valves are selected from the group consisting of a knife valve, needle valve, cone valve, ball valve, lobe valve, and combinations thereof The number of retractable valves is dependent on the viscosity of the material being processed, velocity, pressure, passageway diameter, fouling characteristics of the material, and the like. In certain embodiments, three retractable valves to about ten retractable valves are present. In certain preferred embodiments, six retractable valves are present. In certain preferred embodiments, eight retractable valves are present. As one skilled in the art will appreciate, the number of retractable valves will be dependent upon the particular equipment available.

In certain embodiments, at least one of said retractable valves is capable of being in an open position when the other of said retractable valves is partially closed.

It is contemplated that the retractable valves (of which there at least two but possibly many additional retractable valves) would open and close simultaneously and continuously (so that the equipment would never need to take any off-line to clean individual valves but would be constantly cleaning and maintaining adequate pressure.

The array of retractable valves may be in a large number of different arrangements (i.e., adjacent retractable valves are oriented at about 0° to about 180° to each other and may differ along the array). In certain embodiments, the array of retractable valves forms a tortuous path for the flow of materials through the passageway. Preferably, adjacent retractable valves are oriented at about 180° to each other to maximize the pressure loss per valve and minimize the number of total valves.

In certain embodiments, the step of processing includes transporting said fouling fluid under pressure.

In certain embodiments, the fouling fluid has a viscosity of at least about 10,000 cP. In certain embodiments, the fouling fluid has a viscosity of at least about 15,000 cP.

In certain embodiments, the fouling fluid is a fractionated lignocellulosic slurry comprising:

- a solid fraction comprising:
  - lignin; and
  - cellulose; and
- a liquid fraction comprising:
  - soluble $C_5$ saccharides; and
  - water.

In certain embodiments, the fouling fluid is a slurry comprising:

- a solid fraction comprising:
  - lignin; and
- a liquid fraction comprising:
  - soluble $C_6$ saccharides; and
  - water.

In certain embodiments, the passageway is substantially cylindrical. However, other shapes and cross-sections are possible.

In certain embodiments, at least one shutoff valve is present and may be used to fully shutoff flow in the passageway. The shutoff valve may positioned anywhere in the passageway, including within the array of retractable valves, before the array of retractable valves, or after the array of retractable valves in the distal end of the passageway (nearest exit of passageway in direction of flow). Preferably, it is positioned in the distal end of the passageway. Suitable shutoff valves include, but are not limited to, cone valves, ball valves, knife valves, needle valves, or lobe valves, wherein said valves may be used in the fully closed position to stop flow within the passageway.

The pressure drop in the apparatus of the invention will depend upon the particular material that is being processed. In certain embodiments, the pressure drop in said apparatus is about 50 bars to about 250 bars.

The methods of the invention are preferably run continuously, although they may be run as batch or semi-batch processes.

In certain embodiments, the fractionated lignocellulosic biomass slurry is prepared by contacting said lignocellulosic biomass with a first reaction fluid comprising hot compressed water and, optionally, carbon dioxide; wherein said first reaction fluid further comprises acid, when said lignocellulosic biomass comprises softwood; and wherein said first reaction fluid is at a temperature of at least about 100° C. under a pressure sufficient to maintain said first reaction fluid in liquid form. The acid may be an inorganic acid or an organic acid, or an acid formed in situ. Inorganic acid include, but are not limited to: sulfuric acid, sulfonic acid, phosphoric acid, phosphonic acid, nitric acid, nitrous acid, hydrochloric acid, hydrofluoric acid, hydrobromic acid, hydroiodic acid. Organic acids include, but are not limited to, aliphatic carboxylic acids (such as acetic acid and formic acid), aromatic carboxylic acids (such as benzoic acid and salicylic acid), dicarboxylic acids (such as oxalic acid, phthalic acid, sebacic acid, and adipic acid), aliphatic fatty acids (such as oleic acid, palmitic acid, and stearic acid), aromatic fatty acids (such as phenylstearic acid), and amino acids. In certain embodiments, the acid is preferably sulfuric acid, hydrochloric acid, phosphoric acid, nitric acid, or a combination thereof. Gaseous compounds that form acid in situ include, but are not limited to, $SO_2$.

While the preferred forms of the invention have been disclosed, it will be apparent to those skilled in the art that various changes and modifications may be made that will achieve some of the advantages of the invention without departing from the spirit and scope of the invention. Therefore, the scope of the invention is to be determined solely by the claims to be appended.

When ranges are used herein for physical properties, such as molecular weight, or chemical properties, such as chemical formulae, all combinations, and subcombinations of ranges specific embodiments therein are intended to be included.

The disclosures of each patent, patent application, and publication cited or described in this document are hereby incorporated herein by reference, in their entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed is:

1. A method for reducing fouling in processing of lignocellulosic biomass, comprising:

transporting a fouling fluid comprising lignocellulosic biomass under pressure through an apparatus during processing of the biomass, the apparatus comprising:

a passageway having at least two stages;

a retractable valve positioned in at least one of: an alternating orientation or at an orientation of about 180 degrees relative to each other, in each of said at least two stages;

and an optional shutoff valve positioned in said passageway;

wherein said retractable valves form a tortuous path in said passageway when said retractable valves are partially closed to permit a pressure drop between said stages; and retracting at least one of said retractable valves to an open position to form an open retractable valve when another of said retractable valves is partially closed to clean said open retractable valve and to control pressure and reduce fouling in said apparatus.

2. A method of claim 1, wherein said method is continuous.

3. A method of claim 1, wherein said retractable valve is a knife valve, needle valve, cone valve, ball valve, lobe valve, or combination thereof.

4. A method of claim 1, wherein said shutoff valve is a cone valve, ball valve, knife valve, needle valve, or lobe valve.

5. A method of claim 1, wherein three retractable valves to about ten retractable valves are present.

6. A method of claim 5, wherein at least one of said retractable valves is capable of being in an open position when the other of said retractable valves are partially closed.

7. A method of claim 1, wherein adjacent retractable valves are oriented at about 180° to each other.

8. A method of claim 1, wherein said fouling fluid has a viscosity of at least about 10,000 cP.

9. A method of claim 1, wherein said fouling fluid has a viscosity of at least about 15,000 cP.

10. A method of claim 1, wherein said fouling fluid is a fractionated lignocellulosic slurry comprising:

a solid fraction comprising:

lignin; and cellulose; and a liquid fraction comprising:

soluble $C_5$ saccharides; and water.

11. A method of claim 10, wherein said fractionated lignocellulosic biomass slurry is prepared by contacting said lignocellulosic biomass with a first reaction fluid comprising hot compressed water and, optionally, carbon dioxide;

wherein said first reaction fluid further comprises acid, when said lignocellulosic biomass comprises softwood; and wherein said first reaction fluid is at a temperature of at least about 100° C. under a pressure sufficient to maintain said first reaction fluid in liquid form.

12. A method of claim 1, wherein said fouling fluid is a slurry comprising:

a solid fraction comprising:

lignin; and a liquid fraction comprising:

soluble $C_6$ saccharides; and water.

13. A method of claim 1, wherein said passageway is substantially cylindrical.

14. A method of claim 1, wherein said pressure drop in said apparatus is about 50 bars to about 250 bars.

15. A method for controlling back-pressure in processing of lignocellulosic biomass, comprising:

transporting a fouling fluid comprising lignocellulosic biomass under pressure through an apparatus during processing of the biomass, the apparatus comprising:

a passageway having at least two stages;

a retractable valve positioned in at least one of: an alternating orientation or at an orientation of about 180 degrees relative to each other, in each of said at least two stages;

and an optional shutoff valve positioned in said passageway;

wherein said retractable valves form a tortuous path in said passageway when said retractable valves are partially closed to permit a pressure drop between said stages; and retracting at least one of said retractable valves to an open position to form an open retractable valve when another of said retractable valves is partially closed to clean said open retractable valve and to control back-pressure in said apparatus.

16. A method of claim 15, wherein said method is continuous.

17. A method of claim 15, wherein said retractable valve is a knife valve, needle valve, cone valve, ball valve, lobe valve, or combination thereof.

18. A method of claim 15, wherein three retractable valves to about ten retractable valves are present.

19. A method of claim 18, wherein at least one of said retractable valves is capable of being in an open position when the other of said retractable valves are partially closed.

20. A method of claim 15, wherein adjacent retractable valves are oriented at about 180° to each other.

21. A method of claim 15, wherein said fouling fluid has a viscosity of at least about 10,000 cP.

22. A method of claim 15, wherein said fouling fluid has a viscosity of at least about 15,000 cP.

23. A method of claim 15, wherein said fouling fluid is a fractionated lignocellulosic slurry comprising:

a solid fraction comprising:

lignin; and cellulose; and a liquid fraction comprising:

soluble $C_5$ saccharides; and water.

24. A method of claim 15, wherein said fractionated lignocellulosic biomass slurry is prepared by contacting said lignocellulosic biomass with a first reaction fluid comprising hot compressed water and, optionally, carbon dioxide;

wherein said first reaction fluid further comprises acid, when said lignocellulosic biomass comprises softwood; and wherein said first reaction fluid is at a temperature of at least about 100° C. under a pressure sufficient to maintain said first reaction fluid in liquid form.

25. A method of claim 15, wherein said fouling fluid is a slurry comprising:

a solid fraction comprising:

lignin; and a liquid fraction comprising:

soluble $C_6$ saccharides; and water.

26. A method of claim 15, wherein said passageway is substantially cylindrical.

27. A method of claim 15, wherein said pressure drop in said apparatus is about 50 bars to about 250 bars.

* * * * *

UNITED STATES PATENT AND TRADEMARK OFFICE

CERTIFICATE OF CORRECTION

PATENT NO. : 8,409,357 B2
APPLICATION NO. : 13/437264
DATED : April 2, 2013
INVENTOR(S) : Simard et al.

It is certified that error appears in the above-identified patent and that said Letters Patent is hereby corrected as shown below:

In the Claims

In Column 10, line 34, Claim 24

“24. A method of claim 15,” should read --24. A method of claim 23,--

Signed and Sealed this
Seventh Day of January, 2014

Margaret A. Focarino

*Commissioner for Patents of the United States Patent and Trademark Office*